United States Patent [19]

Horikawa et al.

[11] Patent Number: 5,149,475
[45] Date of Patent: Sep. 22, 1992

[54] METHOD OF PRODUCING A HONEYCOMB STRUCTURE

[75] Inventors: Osamu Horikawa, Toyoake; Koichi Ikeshima, Okazaki, both of Japan

[73] Assignee: NGK Insulators, Ltd., Japan

[21] Appl. No.: 733,173

[22] Filed: Jul. 19, 1991

Related U.S. Application Data

[62] Division of Ser. No. 384,633, Jul. 25, 1989, Pat. No. 5,098,763.

[30] Foreign Application Priority Data

Jul. 28, 1988 [JP] Japan .................. 63-186981

[51] Int. Cl.$^5$ ............................................. B32B 3/12
[52] U.S. Cl. ........................................ 264/67; 55/523; 156/89; 264/162; 264/177.11; 264/177.12; 428/116; 428/188; 502/527
[58] Field of Search ............... 428/116, 188; 55/523; 264/145, 162, 177.12, 177.11; 502/527; 156/89

[56] References Cited

U.S. PATENT DOCUMENTS

| | | | |
|---|---|---|---|
| 2,408,164 | 9/1946 | Foster | 428/542.2 X |
| 3,755,204 | 8/1973 | Sergeys | 428/116 X |
| 3,887,741 | 6/1975 | Dwyer | 428/116 X |
| 3,905,775 | 9/1975 | Soward et al. | 428/116 X |
| 3,983,283 | 9/1976 | Bagley | 428/116 |
| 4,256,172 | 3/1981 | Rahnke et al. | 428/116 X |
| 4,448,833 | 5/1984 | Yamaguchi et al. | 428/116 |
| 4,556,543 | 12/1985 | Mochida et al. | 428/116 X |
| 4,619,912 | 10/1986 | Jalbing et al. | 502/439 |
| 4,839,214 | 6/1989 | Oda et al. | 428/116 |
| 4,869,944 | 9/1989 | Harada et al. | 428/116 |
| 4,948,774 | 8/1990 | Usui et al. | 428/116 X |
| 4,988,483 | 1/1991 | Usui et al. | 502/527 X |
| 5,073,432 | 12/1991 | Horikawa et al. | 428/116 |
| 5,080,953 | 1/1992 | Horikawa et al. | 428/116 |

FOREIGN PATENT DOCUMENTS

| | | | |
|---|---|---|---|
| 0217493 | 4/1987 | European Pat. Off. | |
| 0316595 | 5/1989 | European Pat. Off. | |
| 62-179319 | 11/1987 | Japan | 428/116 |
| 62-176522 | 1/1988 | Japan. | |
| 1-216010 | 11/1989 | Japan | 428/116 |

*Primary Examiner*—Henry F. Epstein
*Attorney, Agent, or Firm*—Parkhurst, Wendel & Rossi

[57] ABSTRACT

A honeycomb structure as a substrate for at least one catalyst includes a ridge arranged on at least one part of an outer surface of the honeycomb structure and extending in a direction of through-apertures thereof, and at least one notch formed in the at least one ridge. A method of producing the honeycomb structure includes the steps of extruding a ceramic batch to form a honeycomb structure having a ridge in the form of a shape extending at least one part of the honeycomb structure in cross-section, and removing at least at one part of the ridge in directions of through-apertures of the honeycomb structure to form a notch. With the arrangement of the honeycomb structure, it is possible to prevent any shifting of the honeycomb structure in directions of through-apertures of the structure and rotation of the structure about its axis relative to a converter can without closing any ends of through-apertures.

5 Claims, 7 Drawing Sheets

FIG_3a
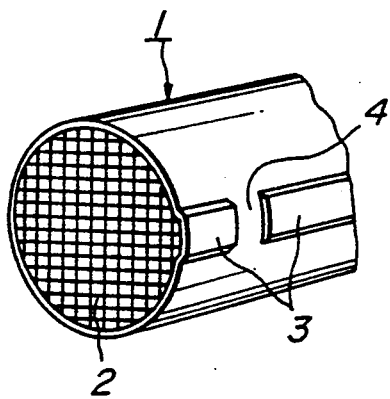
FIG_3b
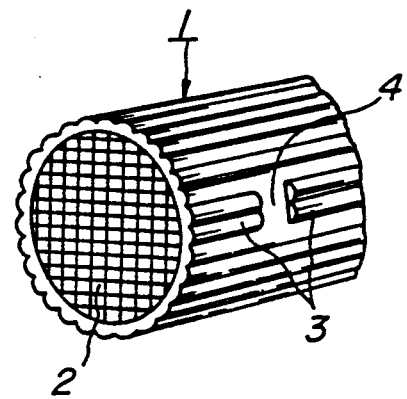
FIG_3c
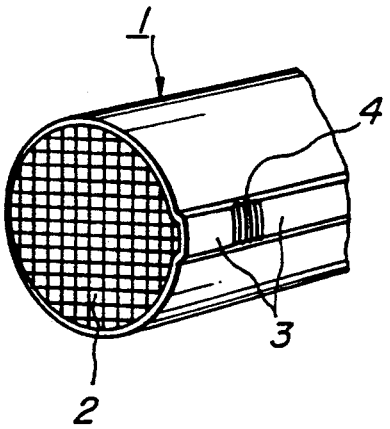
FIG_3d
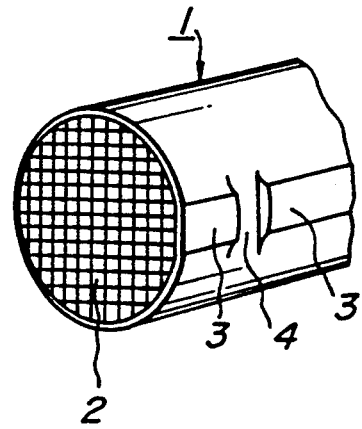

FIG_6c
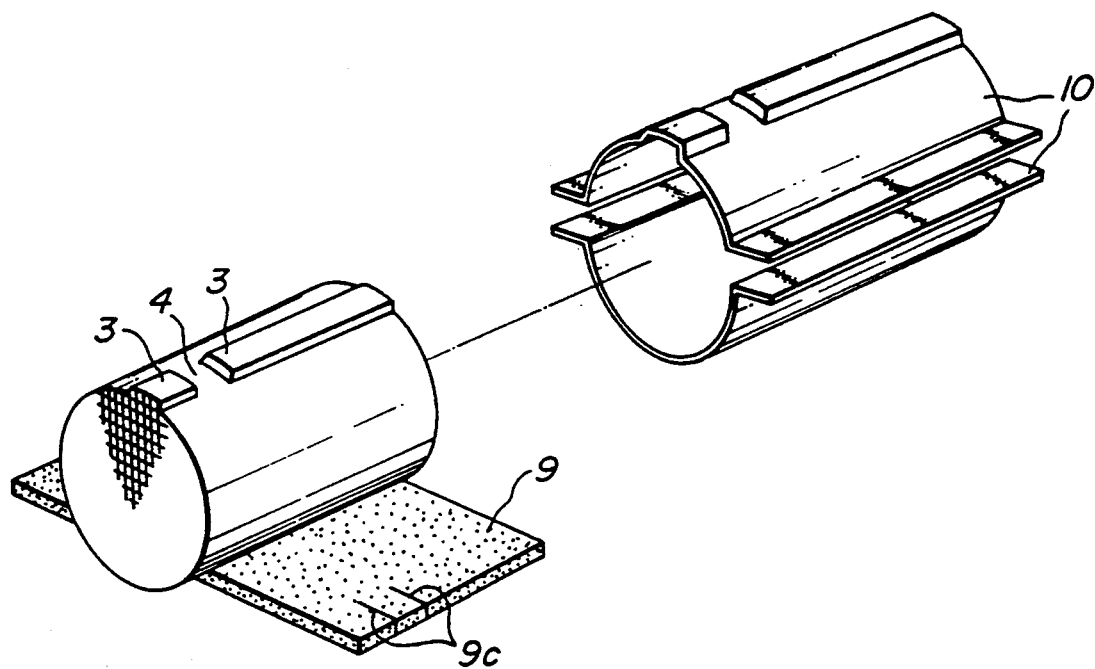

FIG_8a
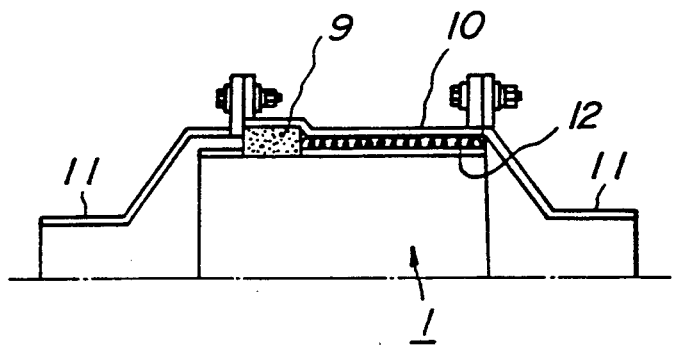
FIG_8b
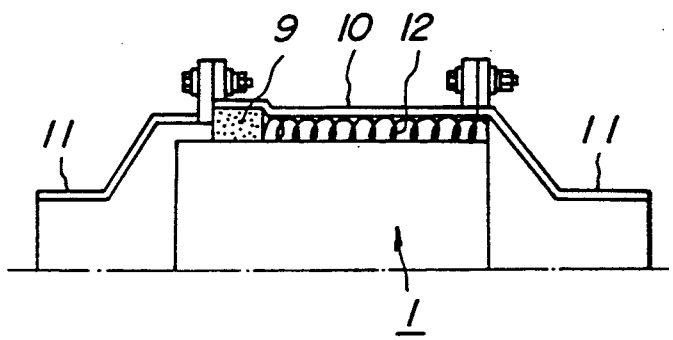
FIG_8c
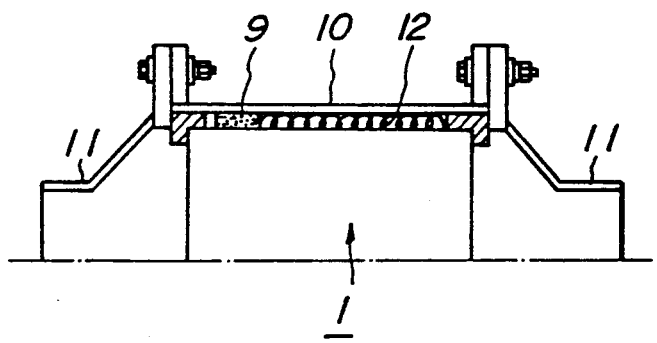

METHOD OF PRODUCING A HONEYCOMB STRUCTURE

This is a division of application Ser. No. 07/384,633 filed Jul. 25, 1989, now U.S. Pat. No. 5,098,763.

BACKGROUND OF THE INVENTION

This invention relates to a honeycomb structure used as a substrate for catalysts for purifying exhaust gases from internal combustion engines, as a filter for removing fine particles in exhaust gases, and as a substrate for various catalysts for deodorizing and/or purifying burnt gases when fuels such as various gases or petroleum are burnt, and more particularly to a method of producing such a honeycomb structure.

FIG. 1 illustrates a catalyst converter which has been generally practically used for purifying exhaust gases from an automobile loaded with the converter. In order to make the converter insusceptible to violent vibrations in use, it comprises cushion members 22-1 and 22-2 and sealing members 22-3 about a honeycomb structure having through-apertures 21-1 through which exhaust gases pass and plate members 23 on upstream and downstream sides of the structure. The cushion members and the sealing members apply forces upon the honeycomb structure in traverse or lateral directions (referred to as "radial directions" hereinafter) of the directions of the through-apertures 21-1 and the plate members 23 apply forces directly or through the cushion members 22-1 onto the honeycomb structure in the directions of the through-apertures 21-1. The honeycomb structure is fixed and held thereat in this manner.

With such a construction of the catalyst converter, however, the cushion members 22-1 or the plate members 23 close some apertures 21-2 of the through-apertures 21-1 so that exhaust gases do not pass through the apertures 21-2, with the result that the catalyst carried by the portions of the apertures 21-2 will be inoperative.

In order to avoid this disadvantage, it has been practically proposed to hold a honeycomb structure in radial directions by seal members arranged radially outward of the honeycomb structure for the purpose of saving catalytic noble metals. Moreover, a honeycomb structure has been known which is formed on its outer circumference with barriers adjacent at least one end face of a sealing member as disclosed in Japanese Utility Model Application Laid-open No. 62-179,319.

With the limitedly practically used honeycomb structure being only radially supported, however, high pressure is required to radially support the structure in order to fix it against movement caused by violent vibrations generated in use. It is possible to support it radially in case that thicknesses of partition walls of the ceramic honeycomb structure are comparatively thick, for example, 0.30 mm to provide a high strength against external pressures. However, such a supporting of the honeycomb structure is not applicable to a honeycomb structure whose partition walls are relatively thin such as 0.15 mm to 0.20 mm and susceptible to external pressures.

In the honeycomb structure disclosed in the Japanese Utility Model Application Laid-open No. 62-179,319, however, partition walls are formed separately from a main body of the honeycomb structure, so that there is a difficulty in adhesiveness therebetween. In more detail, even if a thermosetting inorganic filler consists mainly of a ceramic material such as alumina, silica and the like, it encounters a problem of peeling or separation in the case that a material of the honeycomb structure is cordierite, which is widely used. Such peeling results from thermal shocks which are repeatedly generated in use because of the larger thermal expansion of the filler than that of the honeycomb structure itself.

Therefore, although the high adhesiveness can effectively prevent the members of the structure from being shifted in directions of through-apertures of the structure without increasing the holding force, if the adhesiveness becomes less, it cannot prevent the shifting of the members in the directions of the through-apertures.

The barriers provided on the outer circumference of the structure are effective to prevent the shifting of the members in axial directions, but they do not serve to prevent shifting in radial directions or rotation of the members.

SUMMARY OF THE INVENTION

It is an object of the invention to provide a honeycomb structure and a method of producing the same which eliminate the disadvantages of the prior art to prevent shifting of the structure relative to a converter can or vessel in directions of through-apertures of the structure as well as radial directions or rotating directions.

In order to achieve this object, a honeycomb structure as a substrate for a catalyst according to the invention comprises a ridge arranged on at least one part of an outer surface of the honeycomb structure and extending in a direction of through-apertures thereof, and at least one notch formed in said ridge.

In another aspect of the invention, a method of producing the honeycomb structure comprises the steps of extruding a ceramic batch to form a honeycomb structure having a ridge in the form of a shape extending at least at one part of the honeycomb structure in cross-section, and removing at least one part of the ridge in directions of through-apertures of the honeycomb structure to form a notch.

With the above arrangement, when the honeycomb structure having a ridge arranged on at least one part of the outer surface extending in the direction of the through-apertures is assembled with a sealing member to form a converter, rotation of the structure about its axis relative to the converter can is prevented by means of engagement of the sealing member and the ridge. At the same time, shifting of the structure relative to the converter can is also effectively prevented by steps formed by the notch in the direction of the through-apertures.

According to the method, as the ridge having the notch is formed integral with the honeycomb structure, it is possible to solve the problem of adhesiveness which would occur when the ridge is formed separately from the honeycomb structure. Moreover, as the notch can be formed by cutting, grinding or pattern-pressing, the honeycomb structure provided with the subject features of the invention is formed in a simple manner.

The invention will be more fully understood by referring to the following detailed specification and claims taken in connection with the appended drawings.

BRIEF DESCRIPTION OF THE DRAWINGS

FIGS. 3a-3d are perspective views illustrating various embodiments of honeycomb structures according to the invention, respectively;

FIGS. 6a-6c are views illustrating steps of assembling the honeycomb structure according to the invention into a catalyst converter;

FIGS. 8a-8c are views showing shapes of catalyst converters used in the test for comparing the invention with the prior art.

DESCRIPTION OF THE PREFERRED EMBODIMENTS

Figure 1:
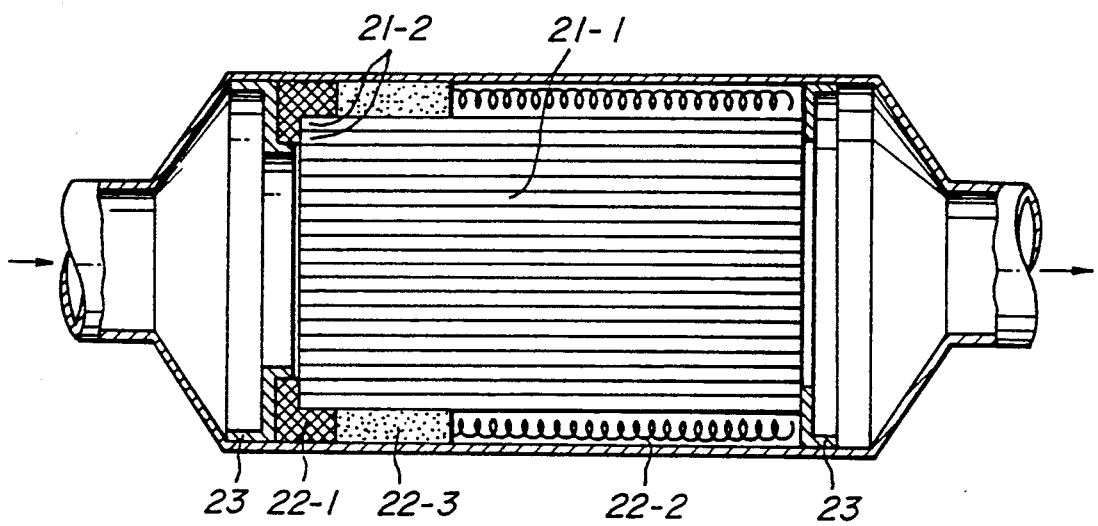
FIGS. 1 and 2 are views illustrating examples of a honeycomb structure and a catalyst converter of the prior art, respectively.
Figure 2:
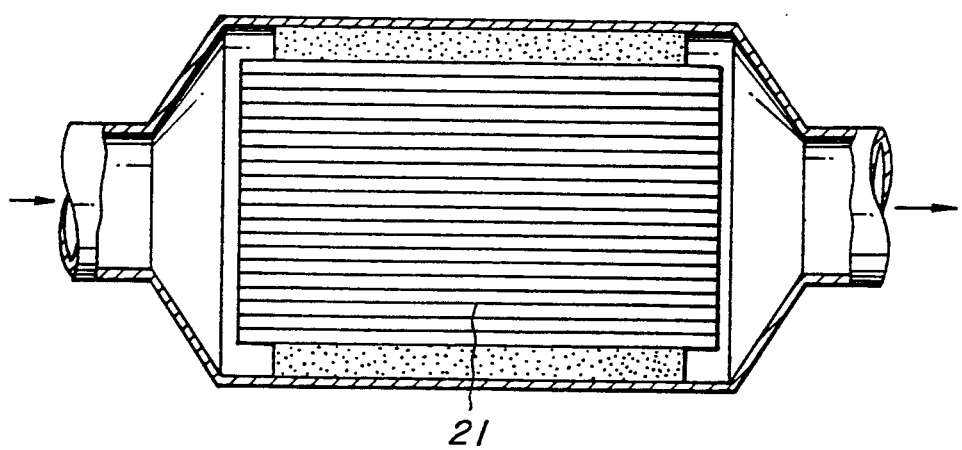

FIGS. 3a-3d illustrate in perspective views various embodiments of a honeycomb structure according to the invention, respectively.

In the embodiment shown in FIG. 3a, a cylindrical honeycomb structure 1 is partially formed on its outer circumference with a ridge 3 extending in parallel with through-apertures 2 and having a predetermined height. The ridge 3 is partially cut to a surface in flush with the outer surface of the structure to form a notch 4.

In the embodiment shown in FIG. 3b, a honeycomb structure 1 is formed fully on its outer circumference with a plurality of ridges 3 extending in parallel with through-apertures 2. Some of the ridges 3 are partially cut to a surface in flush with the outer surface of the structure to form a notch 4.

In FIG. 3c, a cylindrical honeycomb structure 1 is partially formed on its outer circumference with a ridge 3 extending in parallel with through-apertures 2 and having a predetermined height. A part of the ridge 3 is cut to form a notch 4 consisting of a plurality of grooves adjacent each other.

In the embodiment shown in FIG. 3d, edges of a ridge 3 formed on a honeycomb structure 1 are smoothly connected with an outer circumferential surface of the structure 1. In contrast herewith, in the embodiment of FIG. 3a, the ridge 3 forms steps or shoulders relative to the outer circumference of the structure 1.

Figure 4A:
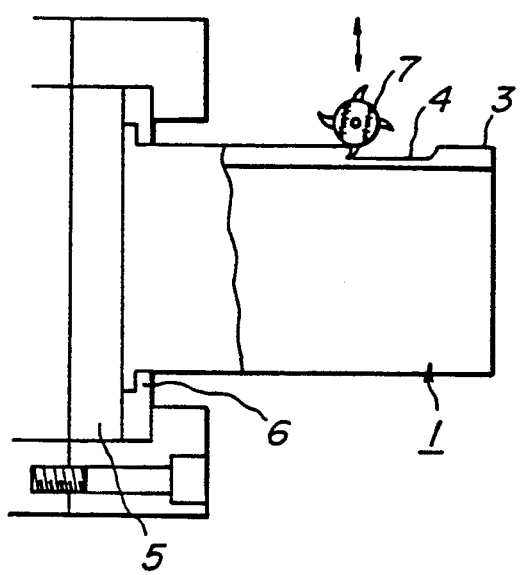
FIGS. 4a and 4b are views illustrating steps of one embodiment of the method of producing the honeycomb structure according to the invention.
Figure 4B:
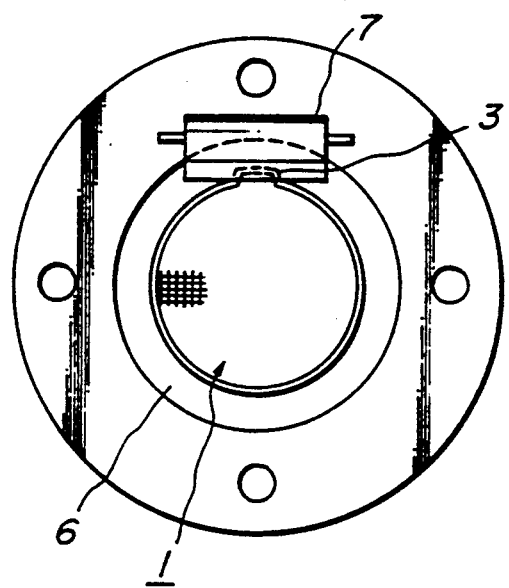

The honeycomb structures as shown in FIGS. 3a, 3b and 3d are preferably manufactured according to steps shown in FIGS. 4a and 4b. In other words, as shown in FIGS. 4a and 4b, a ceramic batch is extruded through a die 5 having a retaining cover 6 formed at its opening with a notch or formed in a predetermined shape to form an integral honeycomb structure having a ridge 3. Thereafter, a cutting tool 7 vertically movably provided relative to the honeycomb structure 1 is lowered to a position where the cutting tool 7 is able to form a predetermined notch 4. The notch 4 is formed in this manner.

The cutting tool may be rotatable. A depth of the notch 4 can be adjusted at will by changing the position where the cutting tool is lowered. In this case, by changing the shape of the cutting tool 7 the notch can be formed such that its bottom is quite coincident with an outer circumferential surface of the honeycomb structure 1.

In the embodiment shown in FIGS. 4a and 4b, the notch 4 is formed by means of the cutting tool 7 immediately after the extrusion of the honeycomb structure 1. In such a case, the notch 4 can be formed by a thin wire such as piano wire without the cutting tool 7 because the extruded structure is still sufficiently soft. As an alternative, after drying or firing the structure, it may be cut by the cutting tool 7 or ground by a grinding wheel such as a diamond wheel.

Figure 5:
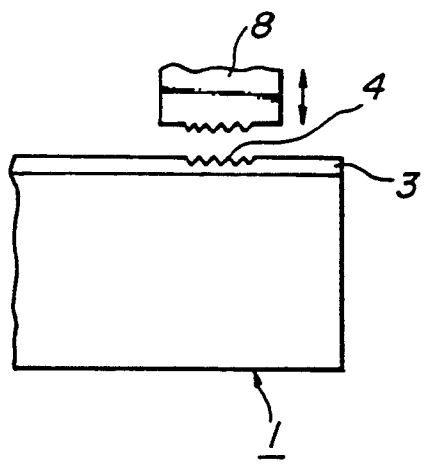
FIG. 5 is a view showing a step of another embodiment of the method according to the invention.

In producing the honeycomb structure 1 as shown in FIG. 3c, after forming a honeycomb structure 1 having a predetermined ridge 3 and before drying it, a pattern tool 8 having serrations is pressed against the ridge 3 at a predetermined position to form grooves by serrations of the pattern tool 8 as shown in FIG. 5. After drying or firing the structure, the notch may of course be formed by cutting or grinding.

Figures 6A, 6B:
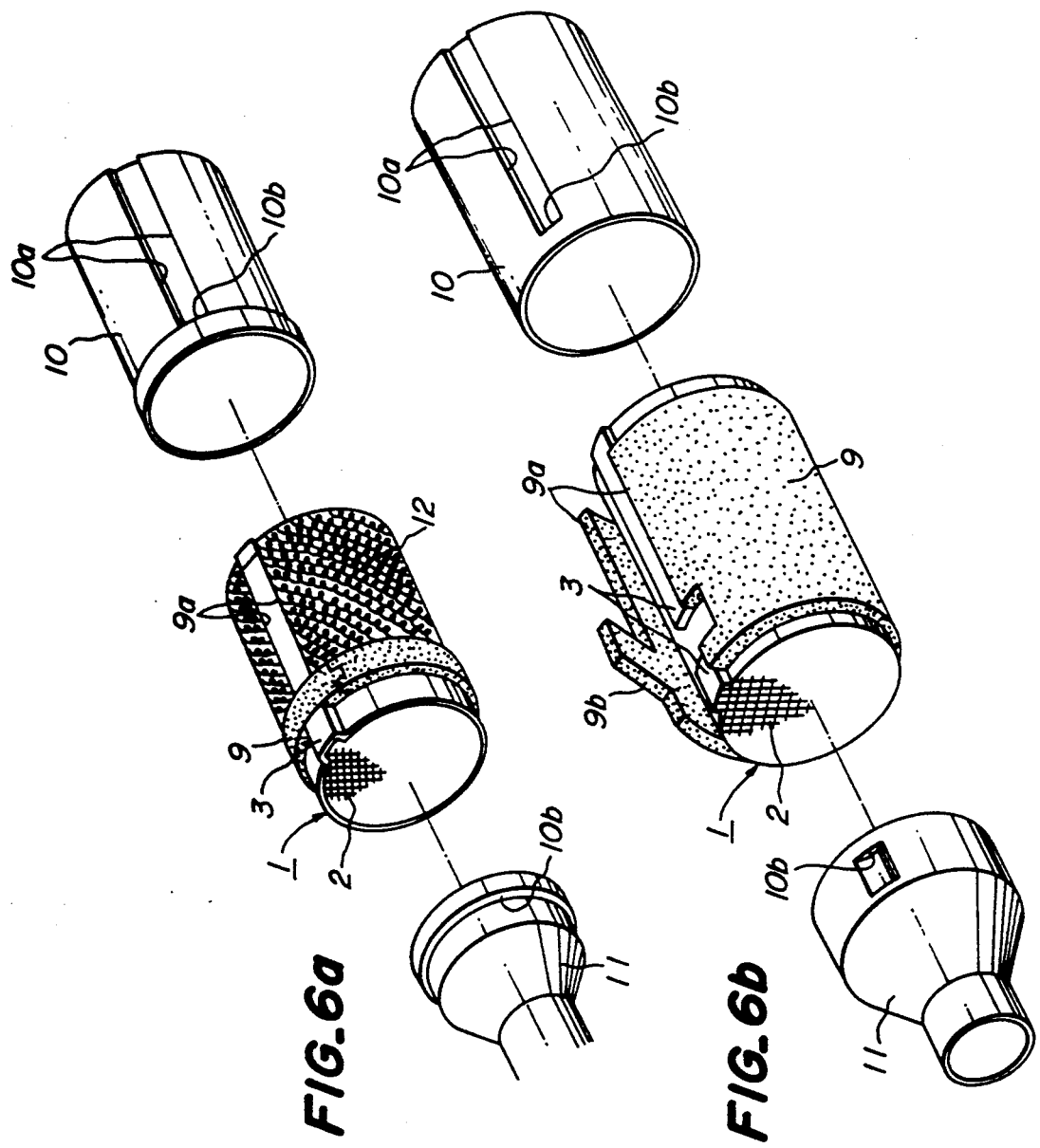

In assembling the honeycomb structures as above descried into converters as shown in FIGS. 6a, 6b and 6c, a honeycomb structure is encircled by a sealing material or member 9 and provided with stainless wires 12 if required. Thereafter the structure is incorporated in converter cans 10 and 11. With such an arrangement, as shown in FIGS. 6a and 6b any rotation of the honeycomb structure 1 about its axis is prevented by abutment of the ridge 3 against edges 9a of the sealing or holding material or member 9 and a projection 10a extending inwardly of the can 10. Moreover, the shifting of the structure 1 in directions in parallel with the through-apertures 2 is prevented by abutment of the notch 4 of the ridge 3 against an end 9b of the sealing member 9 and projections 10b extending inwardly of the cans 10 and 11. In this embodiment, the sealing member 9 is fitted in the notch 4 of the ridge 3. In the embodiment in FIGS. 6a and 6b, a space is formed by the honeycomb structure 1 and the cans 10 and 11 spaced by the ridge 3 and projections 10a and 10b.

FIG. 6c illustrates another embodiment in which a can 10 is similar in shape to the honeycomb structure 1 but slightly larger than the structure 1 and diametrically divided into two halves and a sealing member 9 is filled between the honeycomb structure 1 and the can 10. The sealing member 9 is formed with slits 9c correspondingly to the notch 4 of the honeycomb structure 1 so that shifting of the honeycomb structure 1 in directions parallel to the through-apertures 2 is prevented by the notch 4 and the part o the sealing member 9 between the slits 9c and fitted in the notch 4.

In this manner, the honeycomb structure 1 can be held only by the sealing member 9 without using holding means such as retainers which tend to close the through-apertures, thereby saving cost for manufacturing the cans 10 and 11.

Moreover, if end faces of the ridge 3 and through-apertures corresponding to the notch 4 are closed by a ceramic material or the like, a catalytic precious metal can also be saved.

Actual examples of the honeycomb structure according to the invention will be explained hereinafter.

EXAMPLE 1

A cordierite batch material was extruded and fired to obtain honeycomb structures each having a 100 mm diameter, of 46.5/cm$^2$. Thicknesses of partition walls were 0.20 mm except those of Comparative example 2 which were 0.23 mm. Thicknesses of outer walls were about 0.3 mm.

A honeycomb structure of Embodiment 1 according to the invention had 48 ridges 3 circumferentially arranged like petals, each having a 1 mm height and 2 mm radii of curvatures at a top and a bottom as shown in FIG. 3*b*. Moreover, a notch was at a location 10 mm spaced from one end surface of the honeycomb structure and had a 25 mm length, a 1 mm depth and a width over three ridges 3. A thickness of the outer wall is uniformly 0.3 mm which is different from the embodiment shown in FIG. 3*b* whose outer wall is varied to form the ridges.

A honeycomb structure of Embodiment 2 according to the invention had one ridge 3 having a 1 mm height and a 20 mm width (circumferential length) and a notch 4 at a location 10 mm spaced from one end surface of the structure and having a 25 mm length and a 1 mm depth as shown in FIG. 3*a*.

A honeycomb structure of Embodiment 3 according to the invention was similar to that of the Embodiment 2 with exception of a 0.5 mm height of a ridge and a 0.5 mm depth of a notch.

A honeycomb structure of Embodiment 4 according to the invention had a ridge formed by extending an outer wall 0.3 mm radially outwardly over a 20 mm width (circumferential length) and a notch located spaced 10 mm from one end surface and having a 25 mm length and a 0.3 mm depth.

A honeycomb structure of Embodiment 5 according to the invention had an addition to the notch of the Embodiment 4 a further notch spaced 10 mm from the other end surface and having a 25 mm length and a 0.3 mm depth.

A honeycomb structure of Embodiment 6 according to the invention had two ridges circumferentially 45° spaced each having a 0.3 mm height and a 20 mm width and each formed at its center with a notch having a length of 50 mm.

Figure 7A:
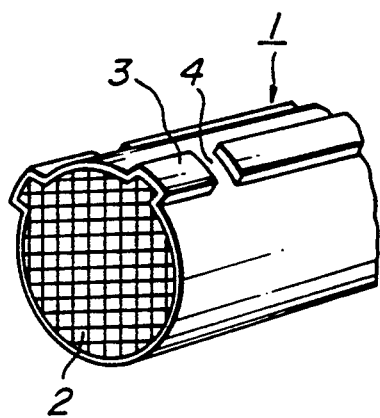
FIGS. 7a and 7b are views illustrating shapes of honeycomb structures used in the test for comparing the invention with the prior art.
Figure 7B:
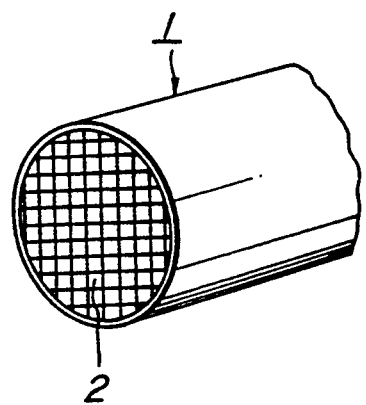

On the other hand, honeycomb structures of Comparative Examples were prepared which did not have ridges 3 and notches 4 as shown in FIG. 7*b*.

These honeycomb structures of Embodiments 1–6 and Comparative Examples 1 and 2 were tested on various performances. The results are shown in Table 1.

TABLE 1

| Kind | Ridge Height mm | Ridge Number | Notch Length mm | Notch Number | Strength against external pressure kg/cm² | Canning test X Damaged ○ Sound |
|---|---|---|---|---|---|---|
| Embodiment 1 | 1.0 | 1 | 25 | 1 | 29~34 | ○ |
| Embodiment 2 | 1.0 | 1 | 25 | 1 | 18~25 | X |
| Embodiment 3 | 0.5 | 1 | 25 | 1 | 23~26 | X |
| Embodiment 4 | 0.3 | 1 | 25 | 1 | 15~22 | X |
| Embodiment 5 | 0.3 | 1 | 25 | 2 | 22~26 | X |
| Embodiment 6 | 0.3 | 2 | 50 | 1 × 2 | 18~24 | X |
| Comparative example 1 −1 −2 | — | — | — | — | 20~31 | X |
| Comparative example 2 −1 −2 | — | — | — | — | 78~96 | ○ |

| Kind | Heated vibration test X Structure shifted ○ Not shifted | | | | | | | |
|---|---|---|---|---|---|---|---|---|
| | Holding member (FIG.) | Clearance* mm | Axial shifting | Rotating shifting | Holding member (FIG.) | Clearance* mm | Axial shifting | Rotating shifting |
| Embodiment 1 | 6a | 3.5 | ○ | ○ | — | — | — | — |
| Embodiment 2 | 6a | 3.5 | ○ | X | 6b | 3.5 | ○ | ○ |
| Embodiment 3 | 6a | 3.5 | ○ | X | 6b | 3.5 | ○ | ○ |
| Embodiment 4 | 6a | 3.5 | X | X | 6b | 3.5 | X | X |
| Embodiment 5 | 6a | 3.5 | X | X | 6b | 3.5 | X | X |
| Embodiment 6 | 6a | 3.5 | X | X | 6b | 3.5 | ○ | ○ |
| Comparative example 1 −1 −2 | 6a | 3.5 | X | X | 6c 8c | 3.5 3.5 | X ○ | X ○ |
| Comparative example 2 −1 −2 | 6a | 3.5 2.2 | X ○ | X ○ | 6c 6c | 3.5 2.2 | X ○ | X ○ |

Note
*Clearance between can and structure

In an external pressure strength test, aluminum plates having a thickness of about 20 mm were applied through urethane sheets having a thickness of about 0.5 mm to end surfaces of a honeycomb structure and a circumferential surface of the structure was hermetically surrounded by an urethane tube having a wall thickness of about 0.5 mm. The honeycomb structure was accommodated in a vessel filled with water and the pressure in the vessel was raised slowly. The pressure in the vessel when a sound was generated due to damage of the honeycomb structure was measured.

In a canning test, a ceramic mat as a holding member shown in FIG. 6*b* was wound about a honeycomb structure and this assembly was inserted in a jig. The jig had an inlet whose inner diameter was larger than that of an outlet to form a tapered jig. The inner diameter of the outlet of the jig was substantially the same as an inner diameter of an inlet of a steel pipe or can. The outlet of the jig was attached to the inlet of the can and the honeycomb structure was forced into the can by means of a hydraulic ram. After the honeycomb structure was removed out of the can, an external appearance of the structure was observed. The ceramic mat had a thickness of 4.9 mm. The inner diameter of the steel pipe or can was 104.4 mm.

In a heated vibration test, a holding member shown in Table 1 was wound about a honeycomb structure and the assembly was forced into a steel pipe or can having an inner diameter forming a clearance between the honeycomb structure and a can with a flange welded thereto. Thereafter, hollow conical members were bolted to both ends of the can and tested.

A heated gas at 800° C. by means of a propane burner was caused to flow against the can for two minutes so as to heat the honeycomb structure. Then air at room temperature was caused to flow against the can for two minutes so as to cool the honeycomb structure. One cycle formed by such a heating and a cooling was repeated to 50 cycles while the can was subjected to vibrations of 0-20 g with 200 Hz. Thereafter, the hollow conical members were removed from the can from which the honeycomb structure was removed to observe an external appearance of the structure.

From the results shown in Table 1, it is evident that the honeycomb structures resisting the heated vibration test simulated as actually used conditions are (1) those supported in directions in parallel with through-apertures as well in a hitherto used manner, (2) those including narrow clearances between the honeycomb structures and can such as 2.2 mm or supported by high holding pressure, and (3) those of the embodiments according to the invention having ridges whose heights are more than 0.5 mm. The honeycomb structures according to the invention can be held only on their circumferential surfaces even by low holding pressures. Even the structures having the ridges whose heights are 0.3 mm according to the invention can resist the heated vibration test depending upon conditions to be subjected. The effectiveness of the ridges having the notches according to the invention has been ascertained. It has been moreover found that catalytic noble metal can be saved approximately 8% in comparison of effective volumes of catalysts between those of Embodiments according to the invention and Comparative examples of the prior art.

It is to be understood that the invention is not limited to the above embodiments and various changes and modifications may be made in the invention without departing from the scope of the invention. For example, sizes of the ridges and the notches are not limited to those illustrated and explained because they are of design choice to be determined by used conditions and widths in through-aperture directions of cushion members abutting against the ridges and notches.

Although the cross-sectional shape of the ceramic honeycomb structures is correctly circular in the above embodiments, it is not limited to circular and may be for example elliptical. Moreover, the sectional shape of cells of the honeycomb structures are not limited to square as in the embodiments and the material thereof is not limited to cordierite used in the above embodiments. Furthermore, both ends of through-apertures of the honeycomb structures may of course be alternately closed.

As can be seen from the above description, the honeycomb structure according to the invention comprises at least one ridge having at least one notch on its outer circumferential surface to prevent shifting in through-aperture directions and rotation about its axis, thereby enhancing the reliability of a catalyst converter incorporating the honeycomb structure therein. Moreover, the honeycomb structure according to the invention can be incorporated in a converter without closing any ends of through-apertures so that all the catalytic noble metal carried by the honeycomb structure is effectively used for the purpose.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of producing a honeycomb structure comprising the steps of:

extruding a ceramic batch to form a honeycomb structure having at least one ridge arranged on at least one part of an outer surface of said honeycomb structure and extending in a direction of through-apertures of said honeycomb structure; and removing at least one part of said ridge to form a notch substantially perpendicular to said direction of through-apertures.

2. The method of claim 1, wherein said notch is formed by at least one operation selected from the group consisting of cutting and grinding.

3. The method of claim 1, wherein said notch consists of a plurality of grooves formed by pressing a pattern tool having serrations against the ridge of the honeycomb structure while the honeycomb structure is in a green state.

4. The method of claim 1, further comprising the step of drying said honeycomb structure and said notch is formed after said drying step.

5. The method of claim 1, further comprising the step of firing said honeycomb structure and said notch is formed after said firing step.

* * * * *